(12) United States Patent
Hu

(10) Patent No.: US 7,920,171 B2
(45) Date of Patent: Apr. 5, 2011

(54) METHODS AND APPARATUSES FOR VIGNETTING CORRECTION IN IMAGE SIGNALS

(75) Inventor: Shane C. Hu, Fremont, CA (US)

(73) Assignee: Aptina Imaging Corporation, George Town (KY)

( * ) Notice: Subject to any disclaimer, the term of this patent is extended or adjusted under 35 U.S.C. 154(b) by 766 days.

(21) Appl. No.: 11/802,056

(22) Filed: May 18, 2007

(65) Prior Publication Data

US 2008/0284879 A1   Nov. 20, 2008

(51) Int. Cl.
*H04N 5/228*   (2006.01)
*H04N 5/217*   (2006.01)
*H04N 9/64*   (2006.01)

(52) U.S. Cl. ............... 348/222.1; 348/241; 348/251

(58) Field of Classification Search ............ 348/241, 348/222.1, 251
See application file for complete search history.

(56) References Cited

U.S. PATENT DOCUMENTS

| | | | |
|---|---|---|---|
| 6,140,630 A | 10/2000 | Rhodes | |
| 6,204,524 B1 | 3/2001 | Rhodes | |
| 6,310,366 B1 | 10/2001 | Rhodes et al. | |
| 6,326,652 B1 | 12/2001 | Rhodes | |
| 6,333,205 B1 | 12/2001 | Rhodes | |
| 6,376,868 B1 | 4/2002 | Rhodes | |
| 6,388,706 B1 * | 5/2002 | Takizawa et al. | 348/273 |
| 6,747,702 B1 * | 6/2004 | Harrigan | 348/335 |
| 6,833,862 B1 * | 12/2004 | Li | 348/207.99 |
| 7,023,472 B1 | 4/2006 | Kang et al. | |
| 7,408,576 B2 * | 8/2008 | Pinto et al. | 348/251 |
| 2003/0052987 A1 | 3/2003 | Li et al. | |
| 2005/0007460 A1 | 1/2005 | Stavely et al. | |
| 2005/0030383 A1 | 2/2005 | Li | |
| 2005/0162531 A1 | 7/2005 | Hsu et al. | |
| 2005/0179793 A1 | 8/2005 | Schweng | |
| 2005/0270402 A1 | 12/2005 | Nikkanen et al. | |
| 2005/0275956 A1 | 12/2005 | Larson et al. | |
| 2006/0104627 A1 | 5/2006 | Park | |
| 2006/0204128 A1 * | 9/2006 | Silverstein | 382/275 |
| 2006/0268131 A1 | 11/2006 | Cutler | |
| 2007/0008033 A1 * | 1/2007 | Okazaki | 330/149 |
| 2007/0146506 A1 * | 6/2007 | Lin et al. | 348/241 |
| 2008/0259194 A1 * | 10/2008 | Silverstein | 348/308 |

FOREIGN PATENT DOCUMENTS

| | | |
|---|---|---|
| GB | 2126826 | 9/1982 |
| JP | 2003078809 | 3/2003 |
| KR | 20040073378 | 8/2004 |
| KR | 20040088830 | 12/2004 |

(Continued)

OTHER PUBLICATIONS

Wonpil, Yu, et al., "Vignetting Distortion Correction Method for High Quality Digital Imaging", Pattern Recognition, 2004. Proceedings of the 17th International Conference on Pattern Recognition, Aug. 23-36, 2004, pp. 666-669, vol. 3, Intelligent Robot Res. Div., ETRI, Daejeon, South Korea.

(Continued)

*Primary Examiner* — Nhan T Tran
*Assistant Examiner* — Tuan H Le

(57) ABSTRACT

Methods and apparatuses for vignetting correction of imager pixels signals. A polynomial correction surface is determined based on a pixel array center, height, and width, surface fitting parameters, and pixel coordinates. The pixel signal is then multiplied by the corresponding value from the polynomial correction surface to create a vignetting corrected signal.

16 Claims, 5 Drawing Sheets

FOREIGN PATENT DOCUMENTS

WO WO 2006/028876 3/2006
WO WO2006028876 3/2006

OTHER PUBLICATIONS

Leong, F. et al., "Correction of Uneven Illumination (Vignetting) in Digital Microscopy Images", Oxford University Nuffield Department of Engineering Science, Oxford, UK.

Wonpil Yu, et al., "Practical Anti-vignetting Methods for Digital Cameras", Consumer Electronics, IEEE Transaction, Nov. 2004, pp. 975-983, vol. 50, Issue 4, Div. of Intelligent Robot Res., ETRI, Daejeon, South Korea.

Catrysse, Peter et al., "QE Reduction Due to Pixel Vignetting in CMOS Sensors", Information Systems Laboratory, Stanford University, Stanford, CA, USA.

* cited by examiner

METHODS AND APPARATUSES FOR VIGNETTING CORRECTION IN IMAGE SIGNALS

FIELD OF THE INVENTION

The embodiments described herein relate generally to the field of digital image processing, and more specifically to methods and apparatuses for vignetting correction in digital image processing.

BACKGROUND OF THE INVENTION

Solid state imaging devices, including charge coupled devices (CCD), complementary metal oxide semiconductor (CMOS) imaging devices, and others, have been used in photo imaging applications. A solid state imaging device circuit includes a focal plane array of pixel cells or pixels as an image sensor, each cell including a photosensor, which may be a photogate, photoconductor, a photodiode, or other photosensor having a doped region for accumulating photo-generated charge. For CMOS imaging devices, each pixel has a charge storage region, formed on or in the substrate, which is connected to the gate of an output transistor that is part of a readout circuit. The charge storage region may be constructed as a floating diffusion region. In some CMOS imaging devices, each pixel may further include at least one electronic device such as a transistor for transferring charge from the photosensor to the storage region and one device, also typically a transistor, for resetting the storage region to a predetermined charge level prior to charge transference.

In a CMOS imaging device, the active elements of a pixel perform the necessary functions of: (1) photon to charge conversion; (2) accumulation of image charge; (3) resetting the storage region to a known state; (4) transfer of charge to the storage region; (5) selection of a pixel for readout; and (6) output and amplification of a signal representing pixel charge. Photo charge may be amplified when it moves from the initial charge accumulation region to the storage region. The charge at the storage region is typically converted to a pixel output voltage by a source follower output transistor.

CMOS imaging devices of the type discussed above are generally known as discussed, for example, in U.S. Pat. No. 6,140,630, U.S. Pat. No. 6,376,868, U.S. Pat. No. 6,310,366, U.S. Pat. No. 6,326,652, U.S. Pat. No. 6,204,524, and U.S. Pat. No. 6,333,205, assigned to Micron Technology, Inc.

One problem experienced in film and solid state cameras is vignetting (i.e., lens shading). Vignetting is a phenomenon of a gradual reduction of image brightness in the periphery of an image as compared to the image center. The light fall-off or darkening towards the edges of the image is inherent in optical lenses and is more pronounced with wide angle lenses. In solid state imaging devices (e.g., digital cameras), the photosensor may also introduce additional unwanted vignetting which is affected by many factors such as, for example, microlens placement, photosensor layout, and depth of the photon well. This additional vignetting effect is more complex than optical vignetting and may have directional non-uniformity and minor local variations. Additionally, there are other causes of vignetting such as, for example, physical blockage of the light path within the camera.

As illustrated in FIG. 1, light passes through a lens 10 and illuminates a pixel array 20. Optical vignetting may be approximated by the "cosine fourth" law, where light fall-off is roughly proportional to the fourth power of the cosine of $\theta$ (i.e., $\cos^4(\theta)$), where $\theta$ is the off-axis angle with respect to the pixel array 20. In compact cameras and cameras with wide angle lenses, optical vignetting is more pronounced with an increasing off-axis angle. One known method of vignetting correction utilizes a look up table of correction factors for each pixel in an image. A calibrating image is obtained by imaging a known flat-field. An ideal image is then obtained by selecting ideal pixel values for the known flat-field. The value of each entry of the look up table is derived by dividing the ideal flat field pixel value from the ideal image by the corresponding calibrating pixel value from the calibrating image. Vignetting correction is implemented by multiplying each pixel value of an image by the corresponding factor in the look up table. However, utilizing a look up table requries storage locations capable of storing high precision fractional correction values for each pixel in the image. The storage requirement of this known method of vignetting correction may not be desirable or cost effective. Accordingly, a low cost method of vignetting correction that minimizes storage requirements is needed.

DETAILED DESCRIPTION OF THE INVENTION

In the following detailed description, reference is made to the accompanying drawings which form a part hereof, and in which is shown by way of illustration specific embodiments that may be practiced. These embodiments are described in sufficient detail to enable those of ordinary skill in the art to make and use them, and it is to be understood that structural, logical, or procedural changes may be made to the specific embodiments disclosed.

Figure 1:
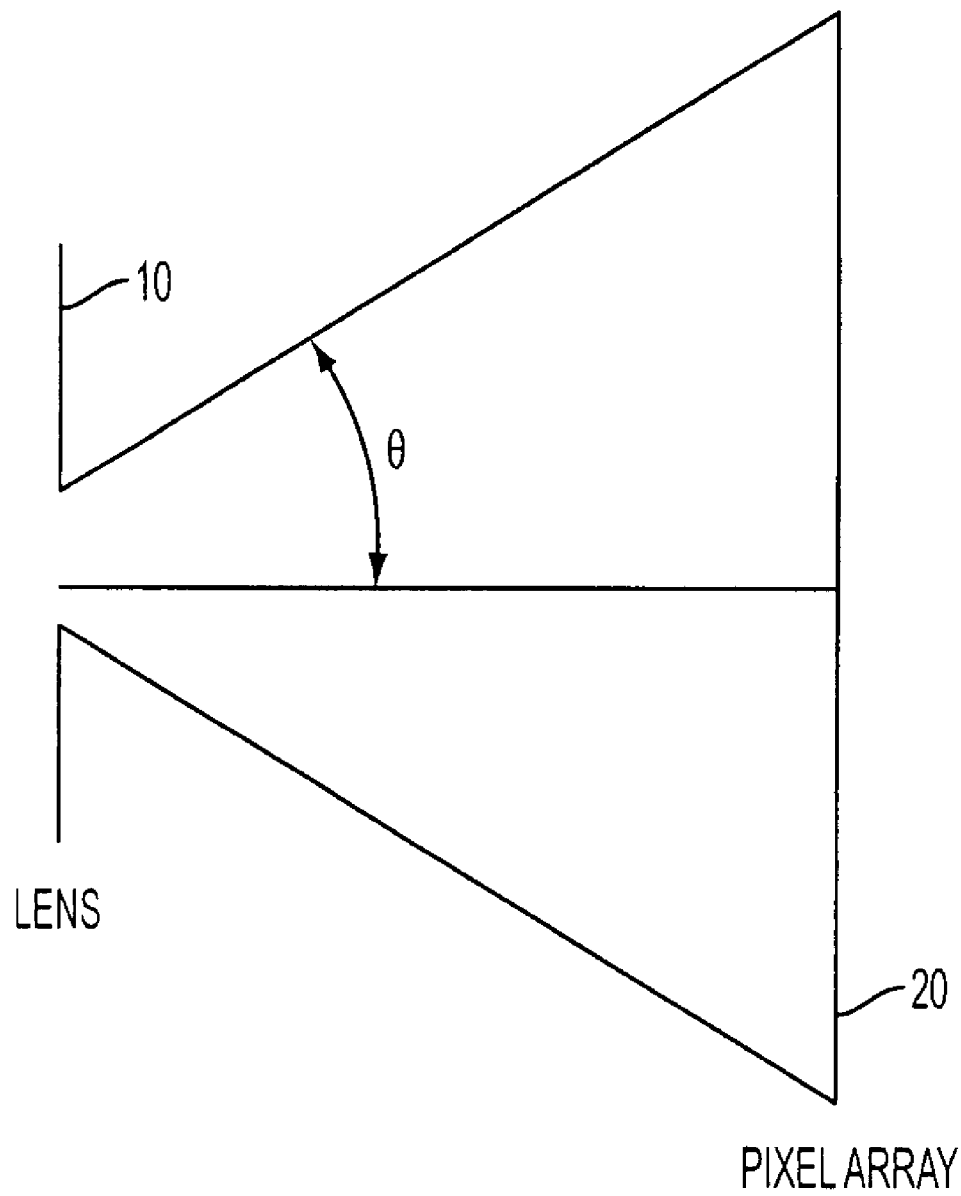
FIG. 1 illustrates a lens focusing light on an image sensor.
Figure 2:
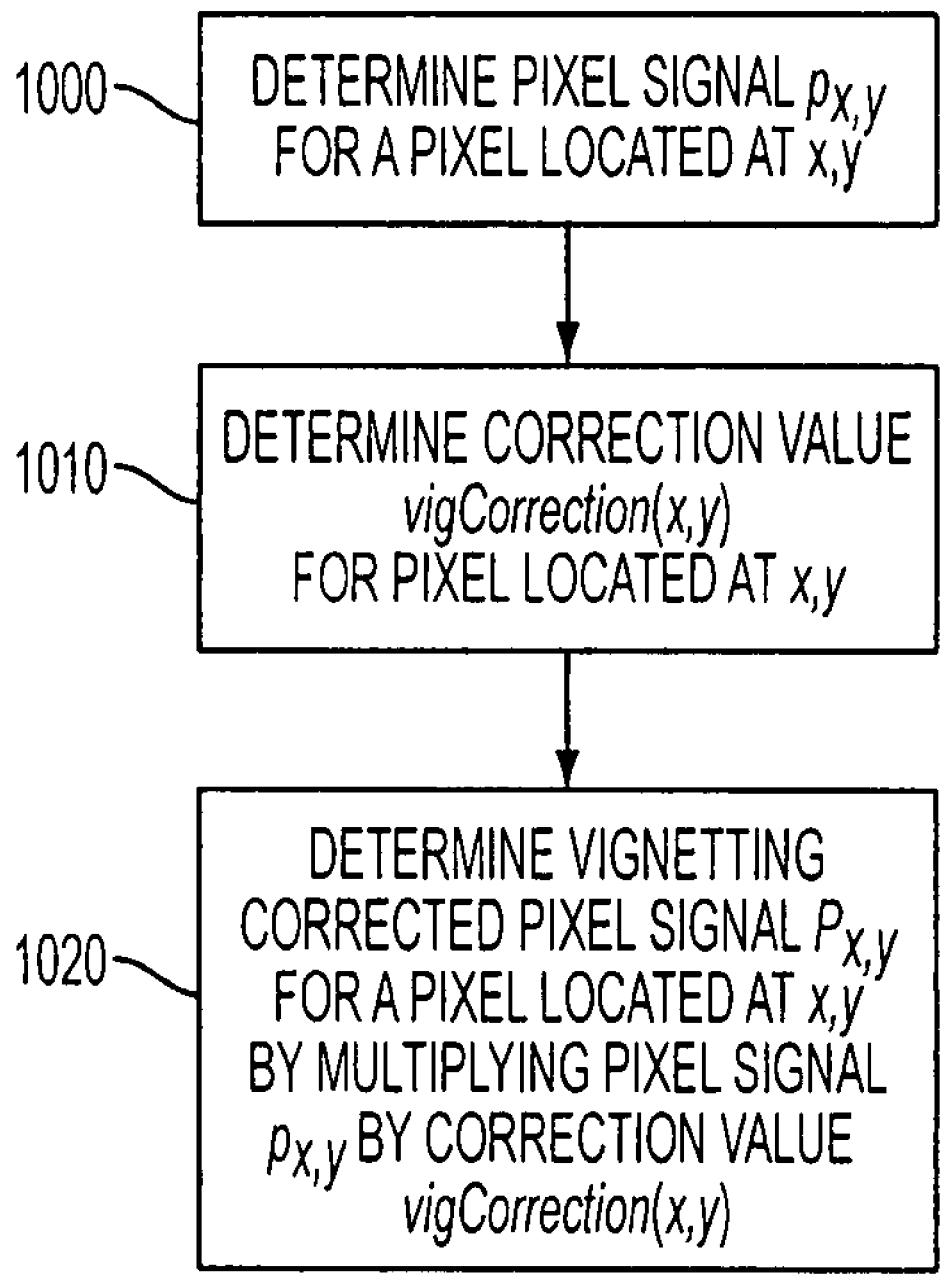
FIG. 2 illustrates a flowchart of a vignetting correction method.

Referring now to FIG. 2, pixel vignetting may be corrected by determining a pixel signal $p_{x,y}$ for a particular pixel (step 1000), determining a correction value vigCorrection(x, y) which may be implemented in a correction value module (step 1010), and multiplying the pixel signal by the correction value (step 1020) which may be implemented in a correction module resulting in a vignetting corrected pixel signal $P_{x,y}$. Accordingly, the vignetting corrected pixel signal $P_{x,y}$ can be calculated at step 1020 as follows:

$$P_{x,y} = p_{x,y} \cdot \text{vigCorrection}(x,y) \quad (1)$$

where x and y are pixel coordinates, $p_{x,y}$ is the pixel signal for the pixel located at x,y, and vigCorrection(x, y) is a function to derive the correction value (i.e., correction surface) for the pixel located at x,y. It should be appreciated that in some instances, steps which follow other steps in the flowchart of FIG. 2 may be in reverse or in a different sequence except where a following procedural step requires the presence of a prior procedural step.

Embodiments described herein provide a vignetting correction value vigCorrection(x, y) approximated by polynomial curve fitting. The vignetting correction value may be approximated as follows:

$$vigCorrection(x, y) = f\left(a \cdot \frac{x-xc}{width}\right) \cdot f\left(b \cdot \frac{y-yc}{height}\right) \quad (2)$$

where f is a function, $$a \cdot \frac{x-xc}{width} \text{ and } b \cdot \frac{y-yc}{height}$$

are operands of the function f, a and b are surface fitting parameters, x and y are pixel coordinates, xc and yc denote the coordinates for the pixel array center, width is the pixel array width, and height is the pixel array height. For ease of discussion, the function f will be generically referred to as $f(z)$ where z represents the operand of the function f (e.g., $$\left(e.g., a \cdot \frac{x-xc}{width} \text{ and } b \cdot \frac{y-yc}{height}\right)$$

The pixel array center may be defined as the geographic center of the pixel array or the optical center of the pixel array (e.g., a pixel with a peak intensity signal for a flat-field image). The geometric pixel array center may not coincide with the optical pixel array center due to, for example, pixel vignetting. While xc and yc may be selected as the geometric pixel array center, more desirable results may occur when xc and yc are selected as the optical pixel array center. It should be appreciated that while the vignetting correction value vigCorrection(x, y) has been described in relation to pixel array center, width, and height, these terms can also be described in relation to image center, width, and height.

A hyperbolic cosine function results in a polynomial curve providing a good approximation for vignetting correction. Therefore, it may be desirable to replace the generic function $f(z)$ in Equation (2) with the hyperbolic cosine function cos h(z) such that:

$$vigCorrection(x, y) = \cosh\left(a \cdot \frac{x-xc}{width}\right) \cdot \cosh\left(b \cdot \frac{y-yc}{height}\right). \quad (3)$$

A Taylor series may be used to approximate the hyperbolic cosine function cos h(z). The Taylor series expansion (represented as $f(z)$) may be defined as:

$$f(z) = \text{SUM}\left\{1 + \frac{z^2}{2!} + \frac{z^4}{4!} + \frac{z^6}{6!} + \frac{z^8}{8!} + \cdots\right\}. \quad (4)$$

For ease of implementation, $f(z)$ may be modified to more accurately approximate the vignetting correction value vigcorrection(x, y) to produce a more accurate vignetting corrected pixel signal $P_{x,y}$. While it should be appreciated that any number of terms in Equation (4) may be used to construct the correction value vigcorrection(x, y), a desired embodiment utilizes three terms to optimize vignetting correction while maintaining a low cost implementation, accordingly:

$$f(z) = \text{SUM}\left\{1 + \frac{z^2}{2} + \frac{z^4}{24}\right\}. \quad (5)$$

In a desired embodiment, the third term Taylor series constant (i.e., 1/24) can be replaced with a variable such that:

$$f(z) = \text{SUM}\left\{1 + \frac{z^2}{2} + \frac{z^4}{v}\right\} \quad (6)$$

where v is a surface fitting parameter allowing for a more customized correction value vigCorrection(x, y). Additionally, in a desired embodiment, the surface fitting parameter v can be selected as a power of two for ease of implementation, with desired results achieved setting v equal to 4, such that:

$$f(z) = \text{SUM}\left\{1 + \frac{z^2}{2} + \frac{z^4}{4}\right\}. \quad (7)$$

By selecting v as a power of two, vignetting correction may be more easily implemented in hardware (e.g., by register shifts rather than fractional multiplication).

Referring to Equation (2) above, the computation of $$a \cdot \frac{x-xc}{width} \text{ and } b \cdot \frac{y-yc}{height}$$

each require one multiply, one divide, and one difference. The numerical principal of forward differencing may be utilized to reduce the calculation of $$a \cdot \frac{x-xc}{width} \text{ and } b \cdot \frac{y-yc}{height}$$

to simple addition for each pixel location. Assuming pixel coordinates x and y start from zero, the starting value of $$a \cdot \frac{x-xc}{width}$$

is:

$$V_x(0) = a \cdot \frac{0-xc}{width} \quad (8)$$

The value for the next pixel in the sequence may be defined as:

$$V_x(1) = a \cdot \frac{1-xc}{width} \quad (9)$$

The difference $D_x$ between $V_x(0)$ and $V_x(1)$ is:

$$D_x = \frac{a}{\text{width}} \quad (10)$$

Therefore $V_x(1)$ can be expressed as:

$$V_x(1) = V_x(0) + D_x \quad (11)$$

Subsequent pixels can be expressed by a recursive expression of Equation (11) such that:

$$V_x(x) = V_x(x-1) + D_x \quad (12)$$

The computational load to calculate $$a \cdot \frac{x - xc}{\text{width}}$$

is reduced to a simple addition as shown in Equation (12) and the initial calculation of parameters $V_x(0)$ and $D_x$.

Forward differencing can be applied to the y coordinate, assuming the starting value $$b \cdot \frac{y - yc}{\text{height}}$$

is:

$$V_y(0) = b \cdot \frac{0 - yc}{\text{height}} \quad (13)$$

The value for the next pixel in the sequence may be defined as:

$$V_y(1) = b \cdot \frac{1 - yc}{\text{height}} \quad (14)$$

The difference $D_y$ between $V_y(0)$ and $V_y(1)$ is:

$$D_y = \frac{b}{\text{height}} \quad (15)$$

Therefore $V_y(1)$ can be expressed as:

$$V_y(1) = V_y(0) + D_y \quad (16)$$

Subsequent pixels can be expressed by the recursive expression of Equation (16) such that:

$$V_y(y) = V_y(y-1) + D_y \quad (17)$$

The computational load to calculate $$b \cdot \frac{y - yc}{\text{height}}$$

is reduced to a simple addition as shown in Equation (17) and the initial calculation of parameters $V_y(0)$ and $D_y$. Accordingly, the vignetting correction calculation can be expressed as:

$$\text{vigCorrection}(x,y) = f(V_x(x)) \cdot f(V_y(y)) \quad (18)$$

where $$V_x(x) = a \cdot \frac{x - xc}{\text{width}} \text{ if } x = 0 \quad (19)$$

$$V_x(x) = V_x(x-1) + D_x \text{ if } x > 0 \quad (20)$$

$$D_x = \frac{a}{\text{width}} \text{ and} \quad (21)$$

$$V_y(y) = b \cdot \frac{y - yc}{\text{height}} \text{ if } y = 0 \quad (22)$$

$$V_y(y) = V_y(y-1) + D_y \text{ if } y > 0 \quad (23)$$

$$D_y = \frac{b}{\text{height}}. \quad (24)$$

Surface fitting parameters a, b, and v and pixel array center coordinates xc and yc may be determined using any calibration method. In a desired embodiment, a calibrating image is obtained by imaging a known flat-field. The pixel array center coordinates xc and yc can be derived from the calibrating image. With known pixel array center coordinates xc and yc, surface fitting parameters a, b, and v may be calculated. The surface fitting parameters may be derived by any method of determining surface fitting parameters, such as, for example exhaustive search or numerical optimization (e.g., example, the Levenberg-Marquardt method).

Figure 3A:
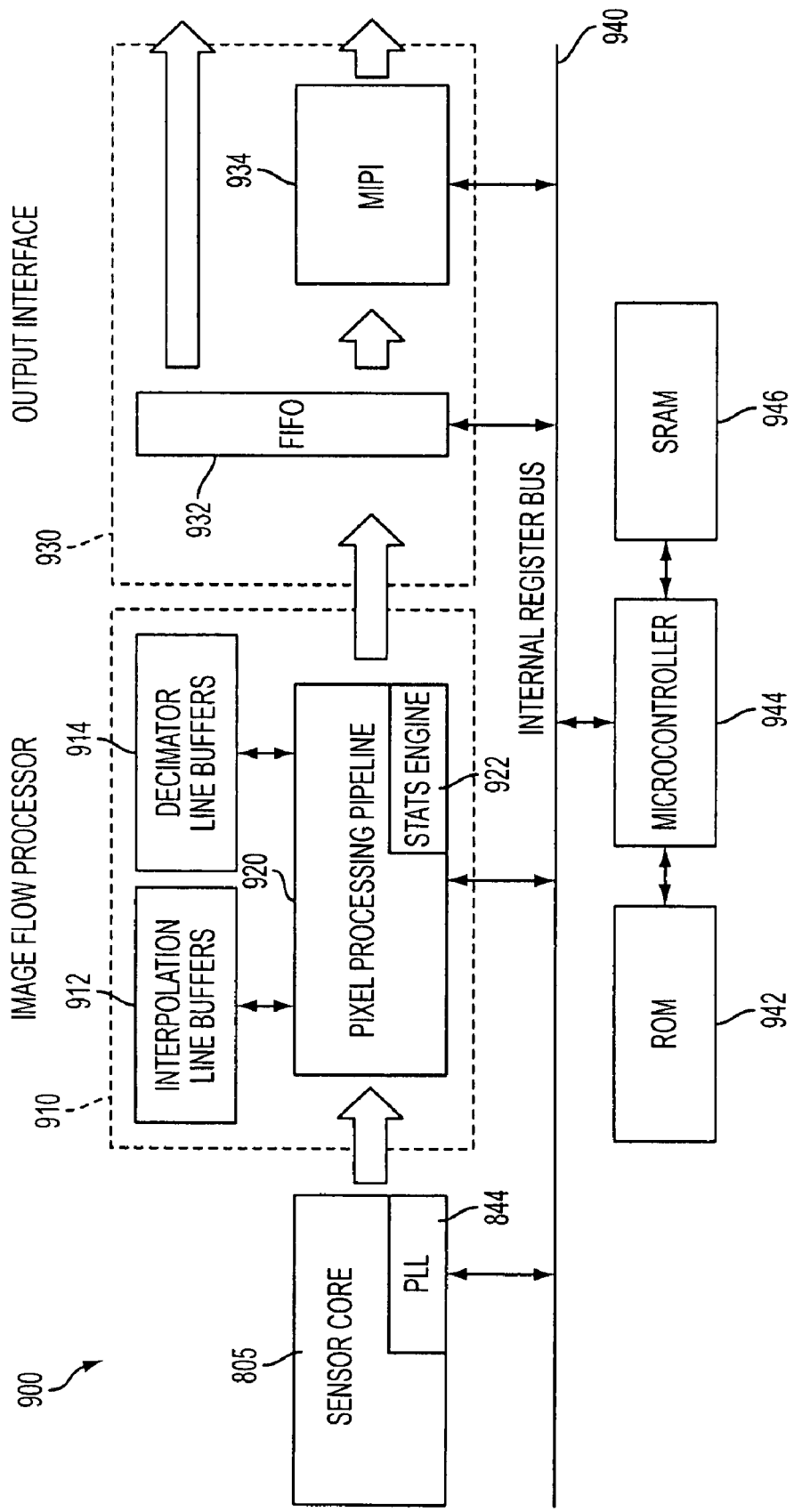
FIG. 3A illustrates a block diagram of system-on-a-chip imaging device constructed in accordance with an embodiment.

FIG. 3A illustrates a block diagram of an exemplary system-on-a-chip (SOC) imaging device 900 constructed in accordance with an embodiment. The imaging device 900 comprises a sensor core 805 that communicates with an image flow processor 910 that is also connected to an output interface 930. A phase locked loop (PLL) 844 is used as a clock for the sensor core 805. The image flow processor 910, which is responsible for image and color processing, includes interpolation line buffers 912, decimator line buffers 914, and a pixel processing pipeline 920. One of the functions of the pixel processing pipeline 920 is to perform pixel processing operations, such as, for example, vignetting correction in accordance with the disclosed embodiments. The pixel processing pipeline 920 includes, among other things, a statistics engine 922. The output interface 930 includes an output first-in-first-out (FIFO) parallel output 932 and a serial Mobile Industry Processing Interface (MIPI) output 934. The user can select either a serial output or a parallel output by setting registers within the chip. An internal register bus 940 connects read only memory (ROM) 942, a microcontroller 944 and a static random access memory (SRAM) 946 to the sensor core 805, image flow processor 910 and the output interface 930.

Figure 3B:
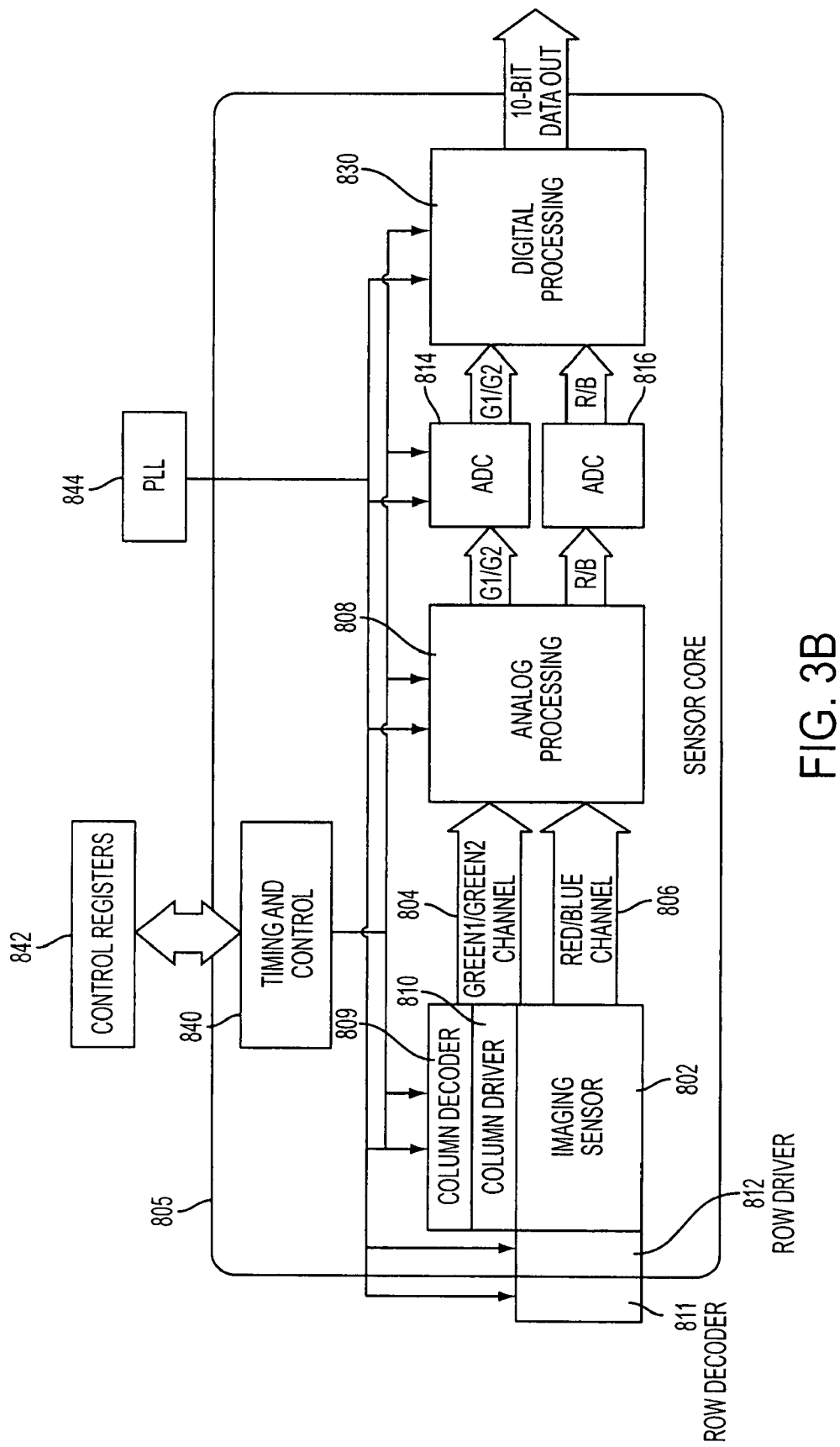
FIG. 3B illustrates an example of a sensor core used in the FIG. 3A device.

FIG. 3B illustrates a sensor core 805 used in the FIG. 3A imaging device 900. The sensor core 805 includes an imaging sensor 802, which is connected to analog processing circuitry 808 by a greenred/greenblue channel 804 and a red/blue channel 806. Although only two channels 804, 806 are illustrated, there are effectively two green channels, one red channel, and one blue channel, for a total of four channels. The greenred (i.e., Green1) and greenblue (i.e., Green2) signals are readout at different times (using channel 804) and the red and blue signals are readout at different times (using channel 806). The analog processing circuitry 808 outputs processed greenred/greenblue signals G1/G2 to a first analog-to-digital converter (ADC) 814 and processed red/blue signals R/B to a second analog-to-digital converter 816. The outputs of the two analog-to-digital converters 814, 816 are sent to a digital processor 830. It should be appreciated that while the sensor core 805 has been described with regard to four color channels, red, greenred, greenblue, and blue, the embodiments are not so limited in number or color.

Connected to, or as part of, the imaging sensor 802 are row and column decoders 811, 809 and row and column driver circuitry 812, 810 that are controlled by a timing and control circuit 840. The timing and control circuit 840 uses control registers 842 to determine how the imaging sensor 802 and other components are controlled, for example, controlling the mode of operation of the imaging sensor 802. As set forth above, the PLL 844 serves as a clock for the components in the core 805.

The imaging sensor 802 comprises a plurality of pixel circuits arranged in a predetermined number of columns and rows. In operation, the pixel circuits of each row in imaging sensor 802 are all turned on at the same time by a row select line and the pixel circuits of each column are selectively output onto column output lines by a column select line. A plurality of row and column lines are provided for the entire imaging sensor 802. The row lines are selectively activated by row driver circuitry 812 in response to the row address decoder 811 and the column select lines are selectively activated by a column driver 810 in response to the column address decoder 809. Thus, a row and column address is provided for each pixel circuit. The timing and control circuit 840 controls the address decoders 811, 809 for selecting the appropriate row and column lines for pixel readout, and the row and column driver circuitry 812, 810, which apply driving voltage to the drive transistors of the selected row and column lines.

Each column contains sampling capacitors and switches in the analog processing circuit 808 that read a pixel reset signal Vrst and a pixel image signal Vsig for selected pixel circuits. Because the core 805 uses greenred/greenblue channel 804 and a separate red/blue channel 806, circuitry 808 will have the capacity to store Vrst and Vsig signals for greenred, greenblue, red, and blue pixel signals. A differential signal (Vrst-Vsig) is produced by differential amplifiers contained in the circuitry 808 for each pixel. Thus, the signals G1/G2 and R/B are differential signals that are then digitized by a respective analog-to-digital converter 814, 816. The analog-to-digital converters 814, 816 supply digitized G1/G2, R/B pixel signals to the digital processor 830, which forms a digital image output (e.g., a 10-bit digital output). The digital processor 830 performs pixel processing operations. The output is sent to the image flow processor 910 (FIG. 3A).

Although the sensor core 805 has been described with reference to use with a CMOS imaging sensor, this is merely one example sensor core that may be used. Embodiments of the invention may also be used with other sensor cores having a different readout architecture. While the imaging device 900 (FIG. 3A) has been shown as a system-on-a-chip, it should be appreciated that the embodiments are not so limited. Other imaging devices, such as, for example, a stand-alone sensor core 805 coupled to a separate signal processing chip could be used in accordance with the embodiments. While the vignetting correction has been described as occurring in the pixel processing pipeline 920 (FIG. 3A), it should be appreciated that vignetting correction can be performed in the digital processing 830 (FIG. 3B). Additionally, raw imaging data can be output from the 10-bit data output (FIG. 3B) and stored and vignette corrected elsewhere, for example, in a system as described in relation to FIG. 4 or in a stand-alone image processing system.

Figure 4:
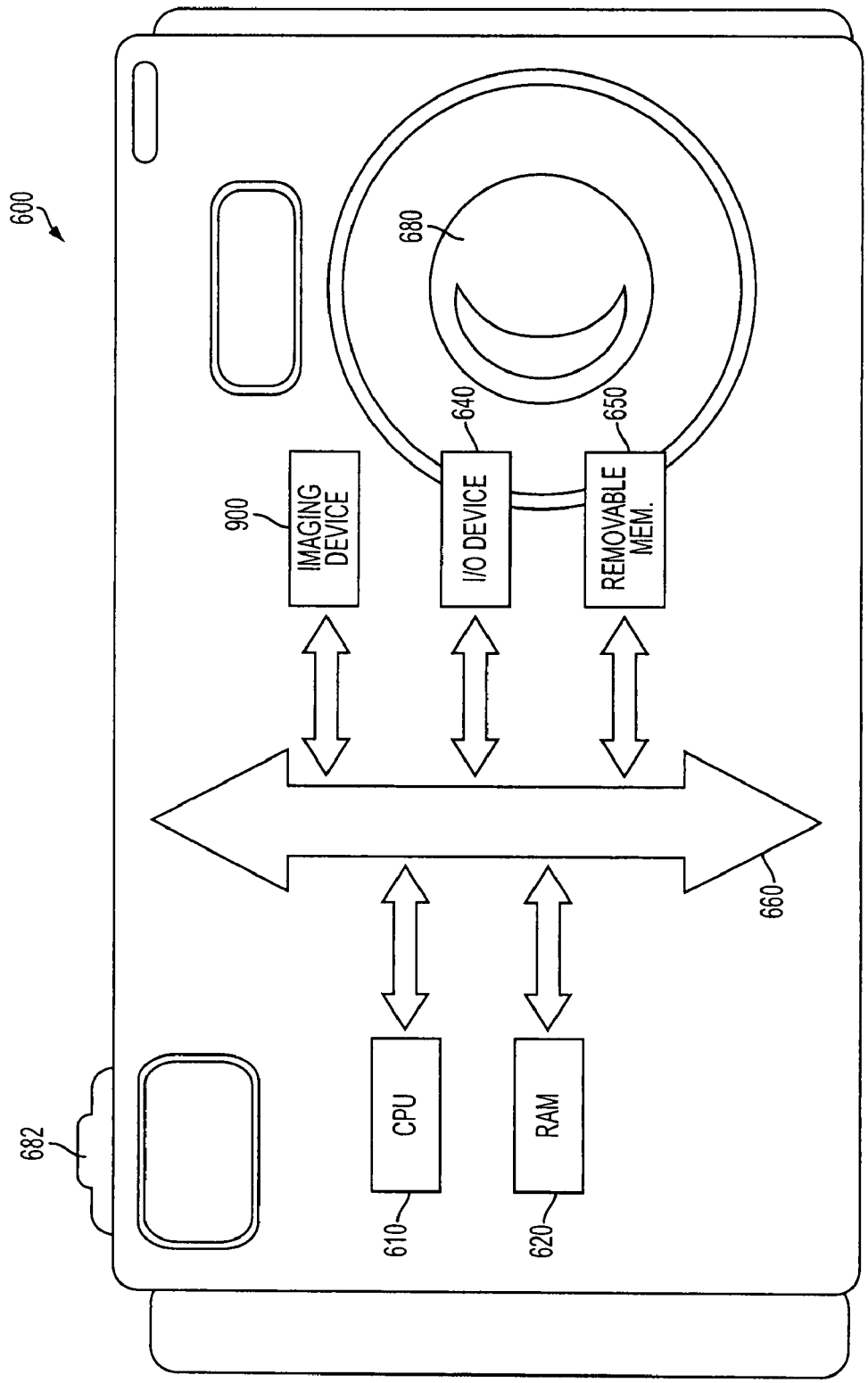
FIG. 4 shows a system embodiment incorporating at least one imaging device.

FIG. 4 shows a typical system 600, such as, for example, a camera. The system 600 is an example of a system having digital circuits that could include imaging devices 900. Without being limiting, such a system could include a computer system, camera system, scanner, machine vision, vehicle navigation system, video phone, surveillance system, auto focus system, star tracker system, motion detection system, image stabilization system, and other systems employing an imaging device 900.

System 600, for example, a camera system, includes a lens 680 for focusing an image on the imaging device 900 when a shutter release button 682 is pressed. System 600 generally comprises a central processing unit (CPU) 610, such as a microprocessor that controls camera functions and image flow, and communicates with an input/output (I/O) device 640 over a bus 660. The imaging device 900 also communicates with the CPU 610 over the bus 660. The system 600 also includes random access memory (RAM) 620, and can include removable memory 650, such as flash memory, which also communicates with the CPU 610 over the bus 660. The imaging device 900 may be combined with the CPU 610, with or without memory storage on a single integrated circuit, such as, for example, a system-on-a-chip, or on a different chip than the CPU 610. As described above, raw RGB image data from the imaging sensor 802 (FIG. 9B) can be output from the imaging device 900 and stored, for example in the random access memory 620 or the CPU 610. Vignetting correction can then be performed on the stored data by the CPU 610, or can be sent outside the camera and stored and operated on by a stand-alone processor, e.g., a computer, external to system 600 in accordance with the embodiments described herein.

Some of the advantages of the vignetting correction methods disclosed herein include providing low cost vignetting correction that can be calibrated involving separable one dimensional methods instead of more complex two dimensional methods. The calibration time, which might be a significant cost factor in a production line, is thus reduced. Additionally, the disclosed vignetting correction methods are simple to implement in hardware or software at a low cost. That is, the methods described above can be implemented in a pixel processing circuit, which can be part of the pixel processing pipeline 920 (FIG. 3A). The pixel processing circuit can be implemented as, for example, hardware logic, a programmed processor, a combination of the two, or with other signal processing circuits. For example, the methods described above can be implemented in computer instructions and stored in a computer readable medium to perform a method of adjusting an imaging pixel signal from raw imaging data as a function of the a correction value and the imaging pixel signal to produce a vignetting corrected pixel signal.

While the embodiments have been described in detail in connection with desired embodiments known at the time, it should be readily understood that the claimed invention is not limited to the disclosed embodiments. Rather, the embodiments can be modified to incorporate any number of variations, alterations, substitutions, or equivalent arrangements not heretofore described. For example, while the embodiments are described in connection with a CMOS imaging sensor, they can be practiced with image data from other types of imaging sensors, for example, CCD imagers and others. Additionally, three or five channels, or any number of color channels may be used, rather than four, for example, and they may comprise additional or different colors/channels than greenred, red, blue, and greenblue, such as e.g., cyan, magenta, yellow (CMY); cyan, magneta, yellow, black (CMYK); or red, green, blue, indigo (RGBI).

What is claimed as new and desired to be protected by Letters Patent of the United States is:

1. A method of adjusting a pixel signal of an image captured by a pixel array, the method comprising:
   determining a correction value for the pixel signal as a function of a polynomial curve based on a pixel position in the array, a center, a pixel array height, a pixel array width, and at least one surface fitting parameter; and
   generating a corrected pixel signal based on the correction value and the pixel signal,
   wherein the correction value is determined according to:

$$vigCorrection(x, y) = f\left(a \cdot \frac{x - xc}{\text{width}}\right) \cdot f\left(b \cdot \frac{y - yc}{\text{height}}\right)$$

where f is a function, $$a \cdot \frac{x - xc}{\text{width}} \text{ and } b \cdot \frac{y - yc}{\text{height}}$$

are operands of the function f, a and b are surface fitting parameters, x and y are pixel coordinates for the pixel signal, xc and yc are center coordinates for the pixel array, width is the pixel array width, and height is the pixel array height.

2. The method of claim 1, wherein the corrected pixel signal is generated by multiplying the pixel signal by the correction value.

3. The method of claim 1, wherein the correction value is determined to correct pixel vignetting.

4. The method of claim 1, wherein the function f comprises a hyperbolic cosine.

5. The method of claim 1, wherein the function f comprises at least a portion of a Taylor series expansion.

6. The method of claim 1, wherein the function f comprises a function of a portion of a modified Taylor series expansion wherein a Taylor series constant is substituted with a surface fitting parameter.

7. The method of claim 1, wherein the center is a geometric center of the pixel array.

8. The method of claim 1, wherein the center is an optical center of the pixel array.

9. A method of adjusting a pixel signal of an image captured by a pixel array, the method comprising:
   determining a correction value for the pixel signal as a function of a polynomial curve based on a pixel position in the array, a center, a pixel array height, a pixel array width, and at least one surface fitting parameter; and
   generating a corrected pixel signal based on the correction value and the pixel signal, wherein the correction value is determined according to:

$$vigCorrection(x,y) = f(V_x(x)) \cdot f(V_y(y))$$

where $$V_x(x) = a \cdot \frac{x - xc}{\text{width}} \text{ if } x = 0;$$

$$V_x(x) = V_x(x - 1) + D_x \text{ if } x > 0$$

where $D_x = \frac{a}{\text{width}}$;

$$V_y(y) = b \cdot \frac{y - yc}{\text{height}} \text{ if } y = 0;$$

and $$V_y(y) = V_y(y - 1) + D_y \text{ if } y > 0$$

where $D_y = \frac{b}{\text{height}}$ where a and b are surface fitting parameters, x and y are pixel coordinates for the pixel signal, xc and yc are center coordinates for the pixel array, width is the pixel array width, and height is the pixel array height.

10. An imaging device comprising:
    an imaging sensor comprising an array of imaging pixels; and
    a signal processing circuit for adjusting signals from the array, the signal processing circuit comprising:
        a correction value module configured to determine a correction value for each pixel signal as a function of a polynomial curve based on the pixel position in the array, a center, a pixel array height, a pixel array width, and at least one surface fitting parameter; and
        a correction module configured to generate a corrected pixel signal for each pixel signal based on the corresponding correction value and pixel signal for the pixel position, wherein the correction value module is configured to determine the correction value according to:

$$vigCorrection(x, y) = f\left(a \cdot \frac{x - xc}{\text{width}}\right) \cdot f\left(b \cdot \frac{y - yc}{\text{height}}\right)$$

where f is a function, $$a \cdot \frac{x - xc}{\text{width}} \text{ and } b \cdot \frac{y - yc}{\text{height}}$$

are operands of the function f, a and b are surface fitting parameters, xc and yc are pixel coordinates for the pixel signal, xc and yc are center coordinates for the pixel array, width is the pixel array width, and height is the pixel array height.

11. The imaging device of claim 10, wherein the correction value is determined to correct pixel vignetting.

12. The imaging device of claim 10, wherein the function f comprises cos h,
    where cos h is a hyperbolic cosine function.

13. The imaging device of claim 10, wherein the function f is defined as:

$$f(z) = SUM\left\{1 + \frac{z^2}{2!} + \frac{z^4}{4!} + \frac{z^6}{6!} + \frac{z^8}{8!} + \cdots\right\}$$

where z is the operand of the function f.

14. The imaging device of claim 10 wherein the function f is defined as:

$$f(z) = SUM\left\{1 + \frac{z^2}{2!} + \frac{z^4}{v}\right\}$$

where v is a surface fitting parameter and z is the operand of the function f.

15. The imaging device of claim 10, which is part of an image processing system.

16. The imaging device of claim 15, wherein the image processing system is a camera system.

* * * * *